United States Patent Office 3,109,728
Patented Nov. 5, 1963

3,109,728
LIQUID NITROGEN-PHOSPHORUS FERTILIZERS FROM WET-PROCESS PHOSPHORIC ACID
Joseph A. Smith, Richmond, and Charles E. Waters, Petersburg, Va., assignors to Allied Chemical Corporation, a corporation of New York
No Drawing. Filed May 3, 1957, Ser. No. 656,771
4 Claims. (Cl. 71—42)

This invention relates to the production of liquid fertilizer compositions suitable for marketing and direct application to the soil; more particularly, it relates to a method of producing nitrogen phosphorus solutions from wet-process phosphoric acid.

There has been a recent trend in the fertilizer field toward the development of liquid compositions suitable for marketing and direct application to the soil. Anhydrous liquid ammonia and ammoniacal solutions of fertilizer salts have commonly been marketed for this purpose. When so used, the compositions must contain a high concentration of the fertilizer elements for it to be economical to ship them in solution form. These elements should be in the solutions in the proper ratios to meet the food requirements of the growing plants. Furthermore, if the solutions are not to be troublesome, in handling, storage or in actual use in the equipment when being applied to the soil, the liquid must have a low enough salting out temperature so that these operations will not be interfered with by excessive deposition of solids from the solution.

Recently a liquid fertilizer composition containing both nitrogen and phosphorus which meets all the necessary requirements for distribution and use has been developed. This liquid fertilizer contains about 26% or more plant food (nitrogen and $P_2O_5$) in about equal proportions by weight and does not salt out at temperatures of 5° C. and higher. This liquid fertilizer composition has been described in application for Letters Patent of Ivan Christoffel bearing Serial No. 510,048, filed May 20, 1955. This liquid fertilizer composition is a solution of ammonium phosphate having substantially the composition $(NH_4)_{1.6}H_{1.4}PO_4$ and ammonium nitrate amounting to 0.65 to 1.15 times the weight of the ammonium phosphate in water amounting to 44–52% by weight of the solution. These compositions are normally prepared by dissolving mono-ammonium phosphate and diammonium phosphate in the weight ratio of 0.58:1 and ammonium nitrate amounting to 0.65 to 1.15 parts by weight of the total ammonium phosphate in water to give a solution containing 48–56% by weight of ammonium phosphate and ammonium nitrate or by absorbing ammonia in phosphoric acid solution until 1.6 mols of ammonia have been absorbed for every one mol of $H_3PO_4$. To this ammonium phosphate solution the required amount of ammonium nitrate is then added either in solution or in solid form with the needed adjustment in the water content of the final product to within the range of ~52% water.

In this latter method it has been customary to make use of phosphoric acid obtained by burning elemental phosphorus and dissolving the resulting $P_2O_5$ in water. This type of acid is frequently referred to as furnace acid. While this process leads to very satisfactory fertilizer compositions, there is a much cheaper type of phosphoric acid available which is usually referred to as wet-process acid. This acid is made by treating phosphate rock with $H_2SO_4$ and filtering out the resulting calcium sulfate. It, however, contains some $H_2SO_4$ as well as compounds of Fe, Al and F and other impurities. This acid is also referred to as table acid when the filtration is carried out in a flat bed, rotary vacuum filter, or "table." Sometimes this acid is subjected to further treatment to remove part of the sulfate, fluoride or both.

However, unless the treatment is very thorough, such acid is still quite impure and often presents difficulties in use.

As has been indicated above, there is no great difficulty in making the nitrogen phosphorus salt solution from phosphoric acid produced from elemental phosphorus for when the acid is neutralized with ammonia, there is no precipitate unless an attempt is made to use too concentrated a solution in which case some ammonium phosphate may separate. However, if ammonium phosphate does precipitate, it can readily be dissolved. The situation when wet-process acid is used is, however, quite different. When about half of the required amount of ammonia has been added to the acid a precipitate begins to form. This increases in amount and becomes very voluminous by the time the entire amount of ammonia has been added. It is far more than a mere turbidity; the mixture cannot be regarded as a somewhat impure solution, but must be treated as a slurry. Actual experience in the field has shown that it is not practical to handle such a mixture in equipment ordinarily used for handling fertilizer solutions. Removal of this precipitate is ordinarily very difficult. The slurry contains materials of a nature that quickly clog a filter and slow filtration to a rate that is not commercially attractive.

It is an object of this invention to provide a method of making nitrogen phosphorus solutions from wet-process phosphoric acid in an economical manner.

It is a further object of this invention to provide a process for making nitrogen phosphorus fertilizer solutions from wet-process phosphoric acid in a continuous operation.

It has been found that these objects and other advantages incidental thereto can be attained by having ammonium nitrate present during the period in which the ammonia is being absorbed.

The nitrogen phosphorus fertilizer solutions may be prepared in a batch or continuous process. When prepared in the batch process, a sufficient quantity of the wet-process phosphoric acid to make the batch of solution is placed in the reaction vessel and the required amount of ammonium nitrate is added as solid or as concentrated aqueous solution. A portion of the ammonium nitrate may be reserved for final adjustment of the composition and some water may be added. The mixture is then preheated so that the heat of ammoniation will bring the temperature to preferably at least about 95° C. before precipitation begins. The mixture is ammonated rather slowly, without vigorous agitation, until the pH is between 5.6 and 6.1, preferably close to 5.9, say 5.85–5.95. The slurry is filtered under about 10" of Hg vacuum to obtain a clear filtrate. The filter cake is washed with water, and the washings are added to the filtrate. The amount of wash water is limited to the amount that will produce a solution of the proper concentration when it is added to the main filtrate. After composition adjustment and cooling, the solution will usually show some turbidity, though not enough to interfere with its use. An alternative procedure, instead of adding the wash liquor to the filtrate, is to add it to the next batch of acid that is to be ammoniated. The operation then becomes a recycle procedure.

The presence of the ammonium nitrate during ammoniation is important when "table" acid is used. This early addition of ammonium nitrate is not a normal procedure because one would be likely to choose to add the ammonium nitrate after filtration, in order to reduce the volume of solution that must pass through the filter. Instead of adding ammonium nitrate, as such, to the phosphoric acid, nitric acid may be added, and neutralized with ammonia in the same operation as the neutralization of the phosphoric acid.

Dilution with water, together with addition of ammonium nitrate, increases filtration rates more than mere dilution with water. It has further been established that violent agitation of the slurry produced when neutralizing the acid slows down the filtration. In moderate scale batch runs, a maximum agitation of 40 r.p.m. with a paddle agitator was found to be acceptable. Increasing the agitation from 40 r.p.m. to 50 r.p.m. resulted in a decrease in filtration rate of about 50%. In the range of 0 to 40 r.p.m. agitation, little effect on filtration rate occurs.

The rate of ammoniation is not critical, yet the rate cannot be excessive without slowing down the filtration. In moderate scale batch runs, ammoniation rates of 3 to 9 pounds per hour per 100 pounds of slurry were found to be acceptable.

The temperature of ammoniation is very important. The temperature should be 80° C. or higher during the entire period of precipitate formation, and it is preferred that it be near the boiling point, at least 95° C., during the formation of most of the precipitate. It is desirable to lower the temperature somewhat below the maximum as the end of ammoniation is approached, in order to minimize any loss of ammonia.

The salting-out temperature of the solution is very sensitive to the degree of ammoniation. In the ammonium nitrate-ammonium phosphate-water solutions considered here, the final pH should be close to 5.9, preferably 5.85–5.95 for minimum salting out point at a given concentration. This requires enough ammonia to supply about 1.55–1.60 mols of ammonia per mol of phosphoric acid, besides neutralizing any other acid that may be present.

The water content of the solution should be between 44% and 56% at start of precipitation and between 40% and 52% at completion.

For commercial production, the use of a continuous vacuum filter such as the Bird or Oliver, is preferred, even if the ammoniation is carried out batchwise but a leaf filter may be used. Excessive pressure differential on the cake is to be avoided. It is good practice to limit the vacuum to about 10 inches of mercury, equivalent to a reduction of pressure of about 5 pounds per square inch below atmospheric.

A number of filter media may be used. A preferred medium is a cloth of monofilament polyethylene thread.

Washing the filter cake is desirable in order to minimize the amounts of nitrogen and $P_2O_5$ included in it. The greater the difference in value of the plant food in the solution and in the cake, the more important the washing becomes. Since the wash liquor is added to the solution, the amount of washing is limited by the amount of wash water that can be used without diluting the solution too much. A practical problem is the avoidance of cracking of the filter cake, or any other behavior that would cause the wash water to go through the cake in channels, thus failing to wash it uniformly.

Examples of Batch Operation

*Example 1.*—(a) 2276 parts of wet-process phosphoric acid analyzing 25.2% $P_2O_5$ were diluted with 216 parts of water and preheated to 100° C. Ammonia was admitted at a rate of 1 gram per minute per liter until a total of 220 parts had been admitted. The temperature during the ammoniation was 102–104° C. Test filtrations of the slurry were then made with the Oliver test leaf, using monofilament polyethylene cloth, P-2201, as the filter medium. The average rate was 93 gallons per hour per square foot.

(b) 1707 parts of the same acid as in (a) were diluted with 165 parts of water, and 778.5 parts of ammonium nitrate were added. The mixture was preheated as before, and ammoniation was carried out, at 108–110° C., at 1 gram per minute per liter until 159.5 parts of ammonia had been added. In a test filtration on the same leaf and cloth as before, a rate of 228 gallons per hour per square foot was observed.

*Example 2.*—200 parts of phosphoric acid analyzing 25.3% $P_2O_5$, 107.0 parts of ammonium nitrate solution analyzing 79.0% ammonium nitrate, and 16.5 parts of water were charged to the reactor at about 30° C. Ammonia was added slowly over a period of 57 minutes to bring the final pH to 5.9. The temperature of the batch was 80° C. at the start of precipitation and maximum temperature during the run was 102° C. The slurry was filtered on an Oliver continuous vacuum filter and the cake was washed with hot water on the filter drum. A clear product consisting of combined filtrate and water and analyzing 13.4–13.3–0, N—$P_2O_5$—$K_2O$ was obtained at a rate of 904 lbs. per hour per square foot of submerged filter surface.

*Example 3.*—1617 parts by weight of wet-process phosphoric acid analyzing 26.6% $P_2O_5$, and 816 parts of 70% nitric acid were diluted with 10 parts of water. The mixture was preheated to 75° C., and ammonia was admitted at a rate of 1 gram per minute per liter until a pH of 6.1 had been attained. The temperature was 114° C. when precipitate began to form. Filtration on the test leaf, with polyethylene cloth P-2201, took place at rates of 220–247 gallons per minute per square foot at 90–95° C.

For continuous operation, three ammoniators in series are preferred. Lowered filtration rates are indicated for use of less than three reactors, whereas there appears to be little advantage to using more than three reactors. The phosphoric acid, ammonium nitrate, and water as needed are fed to the first reactor and ammonia vapor introduced to all three reactors. The presence of ammonium nitrate is important, although a portion of the total ammonium nitrate required can be withheld and added either to the slurry before filtration or to the filtrate. A minimum ratio of 0.25 lb. of ammonium nitrate per lb. of 100% $H_3PO_4$ during ammoniation is desirable for acceptable filtration rates.

Limits considered desirable for the important variables are as follows:

| Ammoniator | Preferred range | | | Permissible range | | |
|---|---|---|---|---|---|---|
| | 1 | 2 | 3 | 1 | 2 | 3 |
| pH | 2.7–3.3 | 4.2–4.6 | 5.7–5.9 | 2.4–3.7 | 3.9–4.9 | 5.6–6.1 |
| Temp., °C | 95–115 | 95–115 | 85–115 | 80–125 | 80–125 | 80–125 |
| Agitation, r.p.m. | 30–50 | 10–30 | 10–30 | 0–60 | 0–50 | 0–50 |
| Time, minutes | 15–30 | 15–30 | 15–30 | At least 10 | At least 10 | At least 10 |

When using three ammoniators, the best pH's have been approximately 3.0 in the first, 4.2 in the second and 5.85 in the third. In a run made using a pH of about 3.8 in the first ammoniator, the filtration rate was approximately half the rate obtained at these best conditions.

Viscosity data were obtained for both washed and unwashed filter cake to serve as a basis for evaluating pump requirements for transferring the cake from the filters to the driers. Viscosity was shown to increase with temperature and decrease with agitation. Tests with a centrifugal pump have shown that well-agitated cake at 70° C. could be pumped, but that unagitated cake would not flow properly to the pump.

Filter cake from the process may be dried on a double-drum drier. For example, cakes from preparation of a 13–13–0 liquid product were dried on such a drier from an initial moisture content of about 50% to about 3 to 4% using steam at 75 to 100 p.s.i.g. Drying rates from 5.8 to 10.3 pounds of dry product per hour per square foot of drier surface were obtained. This product has a bulk density of about 35 lbs. per cu. foot. Filter cakes have also been dried in a rotary drier using a recycle of dried material to minimize sticking.

*Examples of Continuous Operation*

Examples of the preparation of liquid fertilizers by the continuous process described above follow:

| Run No. | 1 | 2 |
|---|---|---|
| Phosphoric Acid Rate, Lbs./Min | 5 | 7.3 |
| Phosphoric Acid Analysis, percent $P_2O_5$ | 24.8 | 25.6 |
| Ammonium Nitrate Solution (76% $NH_4NO_3$), Lb./Min | 2.47 | 3.77 |
| First Ammoniator Temp., °C | 105 | 100 |
| First Ammoniator Agitator Speed, r.p.m | 45 | 40 |
| First Ammoniator pH | 3.0 | 3.1 |
| First Ammoniator Retention Time, Min | 17 | 24 |
| Second Ammoniator Temp., °C | 113 | 110 |
| Second Ammoniator Agitator Speed, r.p.m | 28 | 25 |
| Second Ammoniator pH | 4.2 | 4.6 |
| Second Ammoniator Retention Time, Min | 27 | 30 |
| Third Ammoniator Temp., °C | 90 | 92 |
| Third Ammoniator Agitator Speed, r.p.m | 28 | 25 |
| Third Ammoniator pH | 5.8 | 5.8 |
| Third Ammoniator Retention Time, Min | 16 | 29 |
| Filtration Rate on Bird-Young Vacuum Filter, Lb., Filtrate/Hr./Sq. Ft. Submerged Surface | 2,500 | 2,670 |
| Production Rate of 13.2–13.2–0 Fertilizer Solution, Lb./Hr./Sq. Ft. of Filter Surface Submerged | 3,350 | 3,260 |

Although certain preferred embodiments of the invention have been disclosed for purpose of illustration, it will be evident that various changes and modifications may be made therein without departing from the scope and spirit of the invention.

We claim:

1. In a continuous process for producing a solution of ammonium phosphate having substantially the composition $(NH_4)_{1.6}H_{1.4}PO_4$ and ammonium nitrate amounting to 0.65 to 1.15 times the weight of ammonium phosphate in water amounting to 44–52% by weight of the solution the steps comprising continuously feeding ammonium nitrate, water and wet process phosphoric acid produced by leeching phosphate rock with sulfuric acid to three reactors in series with one another while feeding ammonia into each of said reactors, maintaining a minimum ratio of 0.25 pound of ammonium nitrate per pound of 100% $H_3PO_4$ in the feed to the reactors, maintaining the pH of said first reactor between 2.4 and 3.7, maintaining the pH of said second reactor between 3.9 and 4.9, maintaining the pH of said third reactor between 5.6 and 6.1, and continuously filtering off the solid precipitate from the product discharged from the third reactor.

2. In a continuous process for producing a solution of ammonium phosphate having substantially the composition $(NH_4)_{1.6}H_{1.4}PO_4$ and ammonium nitrate amounting to 0.65 to 1.15 times the weight of ammonium phosphate in water amounting to 44–52% by weight of the solution the steps comprising continuously feeding ammonium nitrate, water and wet process phosphoric acid produced by leeching phosphate rock with sulfuric acid through three reactors in series with one another and maintaining a minimum ratio of 0.25 pound of ammonium nitrate per pound of 100% $H_3PO_4$ in the feed, and feeding ammonia into each of said reactors and while moderately agitating the reactants, maintaining the temperature in each of said reactors between 80 and 125° C. and maintaining the pH of said first reactor between 2.4 and 3.7, maintaining the pH of said second reactor between 3.9 and 4.9, maintaining the pH of said third reactor between 5.6 and 6.1, and continuously filtering off the solid precipitate formed during the ammoniation from the product discharged from the third reactor.

3. In a continuous process for producing a solution of ammonium phosphate having substantially the composition $(NH_4)_{1.6}H_{1.4}PO_4$ and ammonium nitrate amounting to 0.65 to 1.15 times the weight of ammonium phosphate in water amounting to 44–52% by weight of the solution the steps comprising continuously feeding ammonium nitrate, water and wet process phosphoric acid produced by leeching phosphate acid to three reactors in series with one another and maintaining a minimum ratio of 0.25 pound of ammonium nitrate per pound of 100% $H_3PO_4$ in the feed and feeding ammonia into each of said reactors while moderately agitating the reactants, and maintaining the pH of said first reactor between 2.7 and 3.3 and the temperature between 95° and 115° C. and maintaining the pH of said second reactor between 4.2 and 4.6 and the temperature between 95° and 115° C. and maintaining the pH of said third reactor between 5.7 and 5.9, and the temperature between 85° and 115° C. and continuously filtering off the solid precipitate formed during the ammoniation from the product discharged from the third reactor.

4. The method of making a fertilizer solution containing a high concentration of available nitrogen and phosphorus which comprises: adding to an aqueous solution of phosphoric acid obtained by treating phosphate rock with sulfuric acid and separating calcium sulfate, sufficient nitrate to provide upon subsequent ammoniation at least one-quarter pound of ammonium nitrate per pound of 100% phosphoric acid, introducing ammonia into the solution while the solution is at a temperature near its boiling point to provide an ammoniated solution having a pH within the range 5.6 to 6.1 and filtering off from the ammoniated solution precipitate formed during ammoniation.

References Cited in the file of this patent

UNITED STATES PATENTS

| | | |
|---|---|---|
| 1,876,501 | Johnson | Sept. 6, 1932 |
| 2,614,040 | Kaikinger | Oct. 14, 1952 |
| 2,656,266 | Calmeyer | Oct. 20, 1953 |
| 2,726,949 | Andres et al. | Dec. 13, 1955 |
| 2,770,540 | Vierling | Nov. 13, 1956 |
| 2,799,569 | Wordie et al. | July 16, 1957 |
| 2,803,531 | Swensen et al. | Aug. 20, 1957 |
| 2,814,556 | Christoffel | Nov. 26, 1957 |

UNITED STATES PATENT OFFICE
CERTIFICATE OF CORRECTION

Patent No. 3,109,728                          November 5, 1963

Joseph A. Smith et al.

It is hereby certified that error appears in the above numbered patent requiring correction and that the said Letters Patent should read as corrected below.

Column 2, lines 51 and 52, for "ammonated" read -- ammoniated --; column 4, line 28, for "minute" read -- hour --; column 6, line 19, after "phosphate" insert -- rock with sulfuric --.

Signed and sealed this 21st day of July 1964.

(SEAL)

Attest:

ESTON G. JOHNSON                            EDWARD J. BRENNER
Attesting Officer                                 Commissioner of Patents